Nov. 17, 1931.  W. WRIGHT  1,831,833
BULL WHEEL
Filed March 19, 1928  2 Sheets-Sheet 1

INVENTOR.
William Wright
BY
ATTORNEYS.

Nov. 17, 1931.  W. WRIGHT  1,831,833
BULL WHEEL
Filed March 19, 1928    2 Sheets-Sheet 2
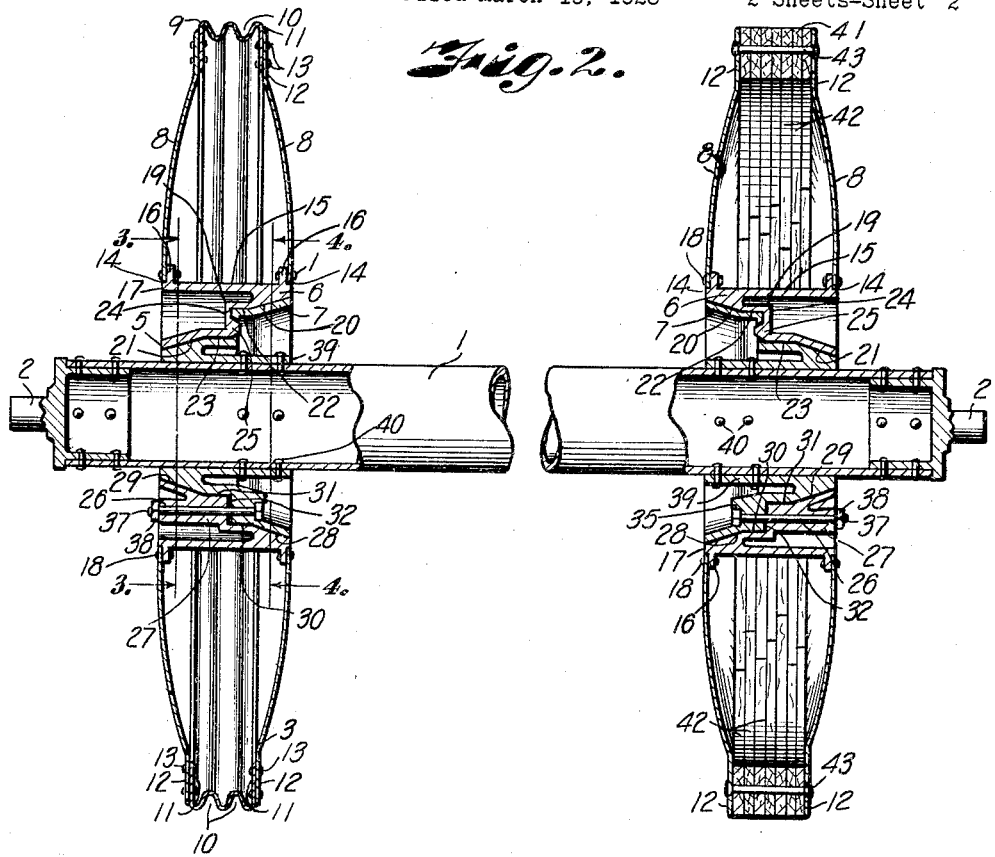
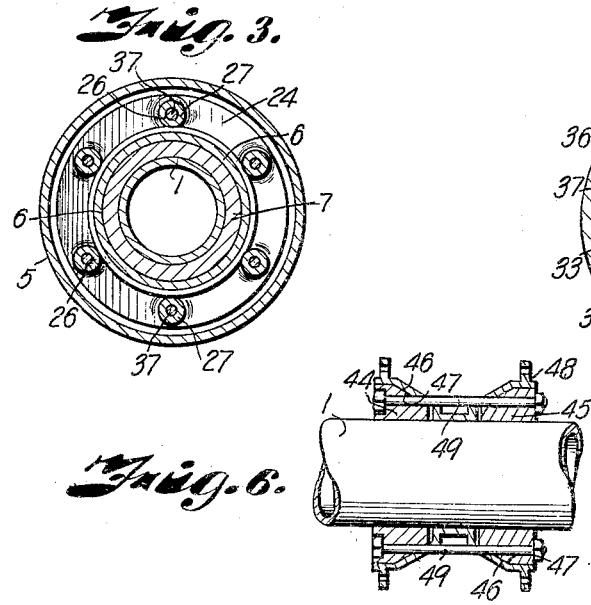
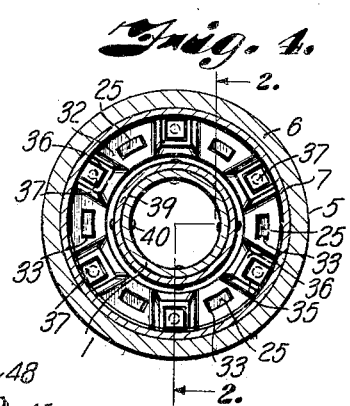
INVENTOR.
William Wright
BY
ATTORNEYS.

Patented Nov. 17, 1931

1,831,833

UNITED STATES PATENT OFFICE

WILLIAM WRIGHT, OF TULSA, OKLAHOMA, ASSIGNOR TO OKLAHOMA IRON WORKS, OF TULSA, OKLAHOMA, A CORPORATION OF OKLAHOMA

BULL WHEEL

Application filed March 19, 1928. Serial No. 262,848.

My invention relates to bull wheels of the type employed in connection with oil well drilling equipment, and has for its principal object to provide a wheel of that character wherein the belt and brake members may be easily and quickly assembled on or removed from their shaft without interference with the wheel structures, and wherein the wheel members are automatically adjusted to proper angular relation with the shaft upon application to the shaft.

It is a further object of the invention to provide a wheel of that character wherein air resistance, disturbing air currents and noise incidental to operation of wheels of this character are reduced to a minimum.

In accomplishing these and other objects of the invention I have provided improved details of structure, the preferred forms of which are illustrated in the accompanying drawings, wherein:—

Fig. 2 is a section on the line 2—2, Fig. 4, the shaft being broken away to illustrate the mounting of the wheel hubs thereon.

Fig. 3 is a section on the line 3—3, Fig. 2.

Fig. 4 is a section on the line 4—4, Fig. 2.

Fig. 6 is a sectional view of a modified form of hub.

Figure 1:
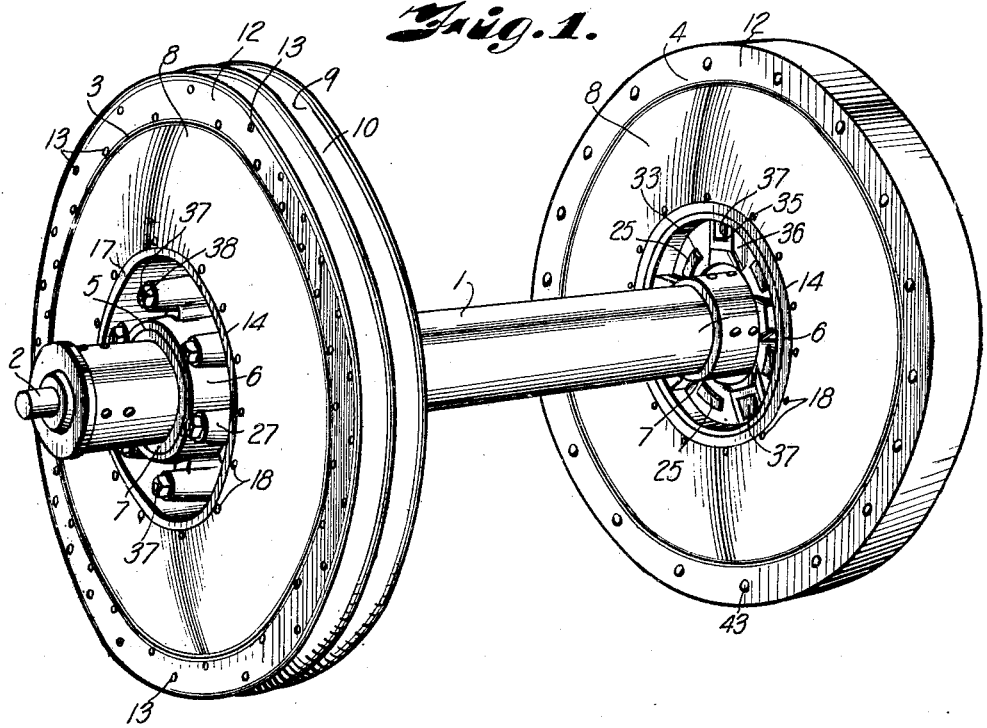
Fig. 1 is a perspective view of a set of bull wheels in assembled relation on a shaft.

Referring in detail to the drawings:

1 designates a bull wheel shaft of ordinary tubular construction, having the usual gudgeons 2 fixed in its outer ends and adapted for rotatable mounting in suitable bearings (not shown).

Mounted on the respective ends of the shaft are belt and brake wheels 3, 4, embodying the novel structural features constituting my invention.

The belt wheel 3 includes a hub unit 5 consisting of mated collar members 6 and 7, web disks 8 attached to the hub collar 6 and carrying a tug rim 9, having the usual rope grooves 10; the disks and rim 9 being preferably constructed of sheet metal, having lips 11 and flanges 12 connected by rivets 13 to form a unitary structure.

The web disks 8 are preferably dished outwardly to afford greater rigidity and are provided with central openings 14 for receiving the rim 15 of the outer hub collar 6 which is provided with peripheral flanges 16 slightly inset from its ends to form shouldered rings 17 for seating the disks; the disks being secured to the flanges 16 by rivets 18.

Figure 5:
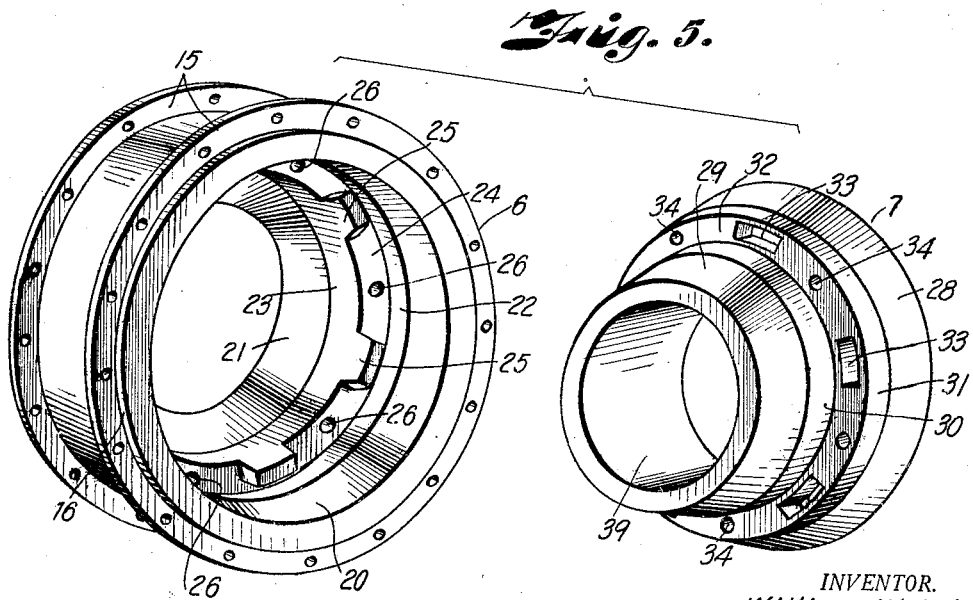
Fig. 5 is a detail perspective view of a pair of mated hub members.

Formed integrally with the rim 15 of the collar member 6 is an inner bearing member 19 provided with inner and outer tapered, annular seats 20 and 21 terminating at their adjacent ends in circumferential bearing walls 22 and 23, separated by a radial wall 24 (Fig. 5).

Formed integrally with the collar member 6 and extending inwardly from the radial wall or shoulder 24 are tapered keeper bosses 25 equally spaced in their circular relation and with relation to the circumferential wall portion 23.

Openings 26 positioned midway between the bosses 25 and extending through the shoulder 24 and through bosses 27 on the outer side of the collar are adapted to receiving bolts or the like for connecting the respective members of the hub unit.

The inner hub collar 7 comprises conical portions 28 and 29 adapted for engagement in the seats 20 and 21 respectively of the collar member 6, circumferential wall portions 30 and 31 at the adjacent ends of the conical portions adapted for location within the mating wall portions 22 and 23 in the collar 6, and a radial wall or shoulder 32 separating the circumferential walls 30 and 31 and provided with rectangular openings 33 extending laterally through the wall 32 and adapted for receiving the keeper bosses 25 of the collar member 6.

Apertures 34 located midway between the openings 33 and terminating in squared sockets 35 in bosses 36 on the inner side of the wall 32 are adapted for receiving bolts 37 which extend through the mating openings 26 in the member 6 to attach the hub members together when in assembled relation; the squared heads of the bolts seating in the sockets 35 and the opposite ends of the bolts being provided with nuts 38 which engage the end of bosses 27 when the parts are assembled.

A sleeve 39 formed integral with the collar 7 receives the shaft 1 and is fixed to the shaft by rivets or the like 40.

The brake wheel is of the same construction as the belt wheel 3, except that its rim 41 comprises a plurality of segment strips 42 preferably of wood to present an efficient braking surface; the segments being arranged in overlapping relation and connected by rivets 43 or like fastening means extended through the lips of the disks and through the segments.

In assembling the apparatus, the inner collars 7 of the hub units 5 are fixed to the shaft in proper spaced relation to form an integral shaft unit which retains its identity as such throughout the period of its practical usefulness.

The wheels 3 and 4, which are primarily composed of the outer collars 6 of the hub units 5 and the web disks 8 with assembled rims 9 and 41 respectively, also constitute complete units which may be assembled with or removed from the hub portions 7 that are fixed on the shaft 1 by removing the bolts 37 whereby the wheels are retained in assembled relation on the shaft.

Being so constructed, the wheels may be readily dismounted from the shaft for shipment or transfer to different well locations, without disturbing their individual unit construction, therefore obviating possiblity of misalignment when they are again assembled on the shaft for operation, and resulting in considerable saving of time due to the simplicity of the assembling operation.

In the modified form shown in Fig. 6 the inner hub comprises separable hub members 44 and 45 having tapered surfaces 46 adapted for mating with tapered surfaces 47 within an outer hub member 48, bolts 49 being applied through the members for retaining them in assembled relation.

What I claim and desire to secure by Letters Patent is:

1. In combination with shaft and wheel members, a sleeve fixed to the shaft member and having an outwardly facing cone element thereon, a sleeve fixed to the wheel member and having a cone element for receiving the element on the shaft, said cone elements having concentric lateral bearing portions and radial abutment flanges intermediate said bearing portions, means in the abutment flanges for keying the members in assembled relation, and means for retaining the members in keyed relation.

2. In combination with shaft and wheel members, a sleeve fixed to the shaft member and having outwardly facing cone element thereon, a sleeve fixed to the wheel member and having a cone element for receiving the element on the shaft, said cone elements having concentric lateral bearing portions and radial abutment flanges intermediate said bearing portions, means in the abutment flanges for keying the members in assembled relation, including projecting lugs in one flange and complementary sockets in the mating flange, adapted to receive the lugs, and means for retaining the members in keyed relation.

3. In combination with shaft and wheel members, a sleeve fixed to the shaft member having conical end portions of unequal diameters, each conical portion continuing in a lateral bearing portion terminating at the approximate center of the sleeve, a radial stop wall connecting the ends of said bearing portions, a sleeve fixed to the wheel member and having conical end portions, bearing portions and a stop wall complementary to said portions of the shaft sleeve member, means in the abutment flanges for keying the members in assembled relation and means for retaining the members in keyed relation.

In testimony whereof I affix my signature.

WILLIAM WRIGHT.